(12) United States Patent
Asada

(10) Patent No.: US 6,570,675 B1
(45) Date of Patent: May 27, 2003

(54) IMAGE FORMING APPARATUS CAPABLE OF CONTROLLING TIMING FOR A PLURALITY OF LASER BEAMS TO WRITE AN IMAGE

(75) Inventor: Kenichirou Asada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/225,290

(22) Filed: Jan. 5, 1999

(30) Foreign Application Priority Data

Jan. 5, 1998 (JP) ............................................ 10-000370
Jan. 6, 1998 (JP) ............................................ 10-001004

(51) Int. Cl.[7] ............................................ G06K 51/00
(52) U.S. Cl. ........................ 358/1.7; 347/235; 347/249; 347/250
(58) Field of Search ................. 358/1.1–1.9, 1.11–1.18; 347/111, 112, 116, 117, 118, 129, 130, 132, 133, 134, 135, 225, 229, 230, 231, 232, 233, 234, 235, 236, 248, 249, 250

(56) References Cited

U.S. PATENT DOCUMENTS

| | | | | |
|---|---|---|---|---|
| 5,539,719 A | * | 7/1996 | Motoi | 369/112 |
| 5,694,637 A | * | 12/1997 | Yoshino et al. | 399/38 |
| 5,844,591 A | * | 12/1998 | Takamatsu et al. | 347/235 |
| 5,852,461 A | * | 12/1998 | Noguchi | 347/116 |
| 5,982,402 A | * | 11/1999 | Yoshikawa et al. | 347/116 |
| 6,041,165 A | * | 3/2000 | Morikawa | 358/1.2 |

OTHER PUBLICATIONS

Takashi Kitamura, Patent Abstract of Japan, Beam Recording Device, 57–8887, Jan. 18, 1982.

* cited by examiner

Primary Examiner—Gabriel Garcia
Assistant Examiner—King Y. Poon
(74) Attorney, Agent, or Firm—Oblon, Spivak, McClelland, Maier & Neustadt, P.C.

(57) ABSTRACT

An image forming apparatus that forms an image by scanning a recording medium with a plurality of light beams that are modulated by individual image forming signals respectively corresponding to the light beams. A beam detecting device detects the plurality of light beams at preset positions and outputs corresponding detection signals. At least one delay device delays each of the detection signals from the beam detecting device by an arbitrary time period which is predetermined individually for each of the detection signals. A reference clock signal generating device generates a plurality of reference clock signals on the basis of delayed detection signals output from the at least one delay device. The image forming apparatus performs an image forming operation according to the plurality of reference clock signals.

25 Claims, 21 Drawing Sheets

IMAGE WRITE START POSITION S

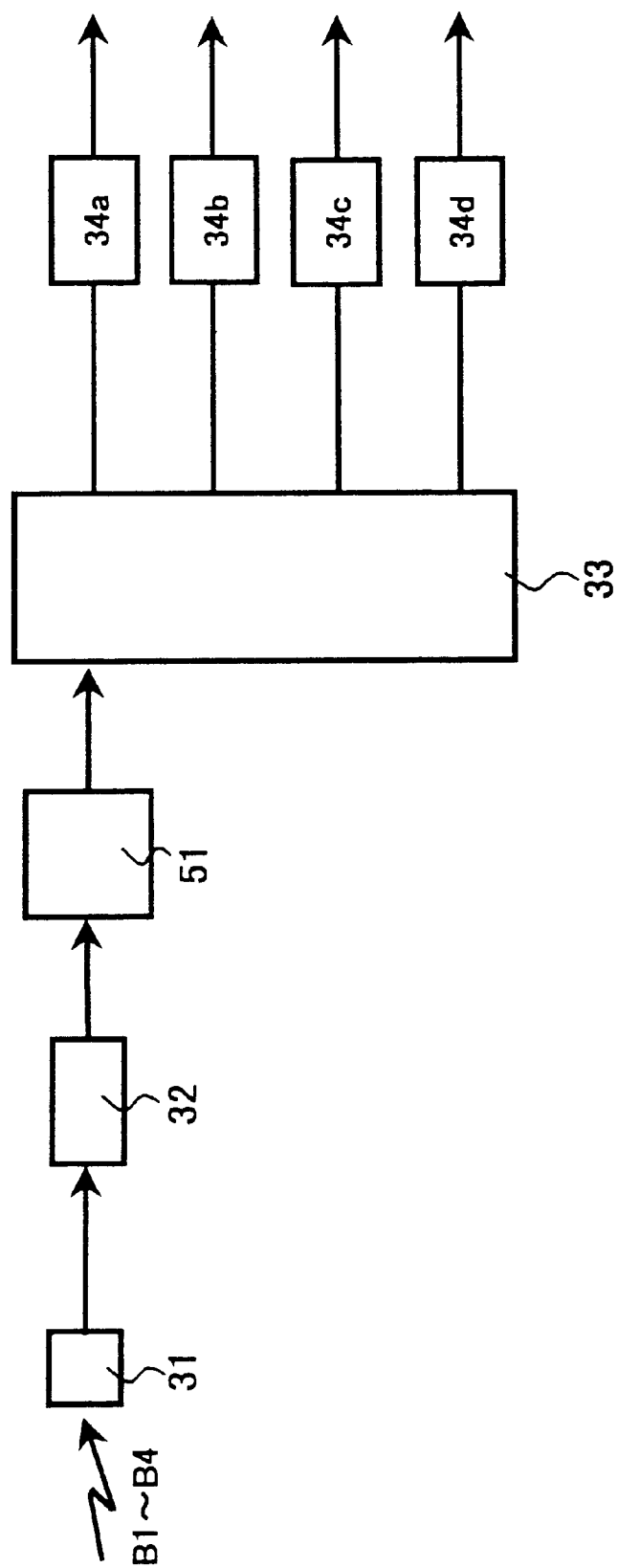

IMAGE FORMING APPARATUS CAPABLE OF CONTROLLING TIMING FOR A PLURALITY OF LASER BEAMS TO WRITE AN IMAGE

BACKGROUND OF THE INVENTION

1. Field of the Invention

The present invention relates to an image forming apparatus, and more particularly to an image forming apparatus that uses a plurality of laser beams to generate marks on a recording medium and that records the marks as an image.

2. Discussion of the Background

In general, many image forming apparatuses that record information on a recording medium using light, such as laser light, have used a single light beam and are therefore required to write an image in sequence on a recording medium with the single light beam. These single-beam image forming apparatuses are typically required to transfer an information signal for modulating the single beam at a relatively high speed in an event of printing an image at a relatively high speed or with a relatively high density. At the same time, the single-beam image forming apparatuses are required to perform a main scanning at a relatively high speed. Accordingly, those apparatuses which use a rotary polygon mirror for scanning the recording medium are required to drive the rotary polygon mirror at a relatively high rotational speed which may reach tens of thousands r.p.m. (revolutions per minute). Therefore, such a single-beam image forming apparatus has a structural limitation to perform a relatively high speed recording operation.

For the reasons as described above, an image forming apparatus which uses a plurality of light beams (multi-beams) has been developed. In such a multi-beam image forming apparatus, the light beams are modulated by each of individual recording signals and simultaneously scan a recording medium. FIG. 14 illustrates an exemplary disposition of light beams in such a multi-beam image forming apparatus that uses a four-laser-beam optical writing device. In this multi-beam optical writing device, distances between adjacent beams among four laser beams B1, B2, B3, and B4 are needed to be equal to a distance between adjacent pixels (hereinafter referred to as a pixel distance) to be formed on the recording medium.

On the other hand, a semi-conductor laser array (hereinafter referred to as a laser diode) that is popularly used as a light beam source for an optical writing device generally has a distance between light emission points (hereinafter referred to as a light emission point distance) which is not equal to, and which is generally greater than, a pixel distance required by a recording device which has a current mainstream resolution of 600 dpi (dots per inch), for example. In order to adjust this difference, as illustrated in FIG. 14, a disposition of four light emission points is inclined at a preset angle θ1 relative to a line L–L' that is orthogonal to a beam scanning direction SL, so that actual beam distances between adjacent beams become equal to a pixel distance Ps.

In the above-described optical writing device, the laser beams B1 to B4 scan a beam detector including at least a photosensor. The beam detector outputs beam detection signals when detecting the laser beams B1 to B4. An exposure starting position (hereinafter referred to as an "image write start position")on the recording medium for each of the laser beams B1 to B4 is determined on the basis of the beam detection signals from the beam detector.

Although various constructions of a beam detector are hitherto known, there are generally two types. One type of beam detector detects a plurality of laser beams with one detector (light detector for detecting the laser beams), and the other type of beam detector detects a plurality of laser beams using a same number of light detectors.

FIGS. 15 to 18 illustrate cases of using a light detector d which has a relatively long beam detecting surface. FIG. 15 illustrates a manner in which the beam detector d is positioned with an end face L–L' thereof made orthogonal to the beam scanning direction SL. In this case, if the operation for writing an image to the recording medium is started at a certain time after each of the laser beams B1 to B4 is received by the beam detector d, a vertical line of the image can be formed as a straight line that is parallel to the aforementioned end surface L–L'.

Namely, when times t1, t2, t3, and t4 at which each of the respective laser beams B1 through B4 reaches the image write start position S passing through the end surface L–L' are set to a uniform time, the vertical line formed by performing a plurality of scanning operations can be configured to a straight line in parallel with the end surface L–L', as shown in FIG. 16.

As shown in FIG. 17, for example, in some cases the beam detector d may be mounted with the end surface L–L' slightly inclined (at an angle θ2) relative to a line orthogonal to the beam scanning direction SL due to a mechanical inaccuracy. In such a case, when each of the laser beams B1 through B4 starts writing an image on the recording medium at a certain time after each of the laser beams B1 through B4 is detected by the beam detector d, as illustrated in FIG. 17, the line formed by connecting at least four image write start positions S is not orthogonal to the beam scanning direction SL. As a result, when the scanning operation is repeated, a vertical line becomes a jagged line having a cycle of four laser beams B1 through B4, as illustrated in FIG. 18.

In a case that the beam detector d includes a plurality of light detectors that form beam detectors d1, d2, d3, and d4 for detecting the laser beams B1 to B4, it is hard to vertically align the beam detectors d1, d2, d3, and d4 since a beam pitch distance is relatively narrow. Accordingly, the beam detectors d1, d2, d3, and d4 may be positioned in a slanting manner as illustrated in FIG. 19. If the beam detectors are disposed in such a manner, a straight line orthogonal to the beam scanning direction SL cannot be formed unless the time from detecting the beam by each of the beam detectors d1 through d4 to starting the operation of writing an image on the recording medium is individually set.

Namely, in such a situation it is required to adjust and set the timing to start writing images (hereinafter sometimes referred to as an "image write start timing"). The image write start timing for the laser beam B1 is set to a time after a time period of t+t1 from a time when the beam detector d1 detects the laser beam B1. The image write start timing for the laser beam B2 is set to a time after a time period of t+t2 from a time when the beam detector d2 detects the laser beam B2. The image write start timing for the laser beam B2 is set to a time after a time period of t+t3 from a time when the beam detector d3 detects the laser beam B3. The image write start timing for the laser beam B2 is set to a time after a time period of t+t4 from a time when the beam detector d4 detects the laser beam B4.

An exemplary method is described in Japanese Laid-Open Patent Publication No. 57-8887/1982 of a control of the image write start position S for an optical writing in a recording device that uses a plurality of laser beams to scan a recording medium to record an image on the recording medium. However, this exemplary control method uses clock signals which have a frequency n times faster than that of pixel clock signals to control the number of pulses of the beam detection signal. Therefore, this method requires a counting of extremely high frequency pulses and, at the same time, a setting of the image write start timing for each of the laser beams individually. Accordingly, in this method, setting values of all the image write start timings for the laser beams are required to be readjusted, even at only a slight adjustment of an image position. This causes a problem for users in adjusting a position of an image on a recording sheet.

Therefore, it is believed that there is no image forming apparatus available that allows a user to perform an easy adjustment of an image position, including a delicate image positioning, without having a jagged line on an image.

SUMMARY OF THE INVENTION

In light of the above and other problems, an object of the present invention is to provide a novel image forming apparatus capable of adjusting an image write start position by adjusting the same at a time difference shorter than a cycle of a reference clock signal with ease.

According to an aspect of the present invention, a novel image forming apparatus of the present invention forms an image by scanning a recording medium with a plurality of light beams that are modulated by individual image forming signals respectively corresponding to the light beams. In this novel image forming apparatus a beam detecting device detects the plurality of light beams at preset positions and outputs corresponding detection signals. Further, at least one delay device delays each of the detection signals from the beam detecting device by an arbitrary time period which is predetermined individually for each of the detection signals. Moreover, a reference clock signal generating device generates a plurality of reference clock signals on the basis of delayed detection signals output from the at least one delay device. The image forming apparatus performs an image forming operation according to the plurality of reference clock signals.

At least one delay device of the image forming apparatus may delay one of the light beams detected at a selected one of the preset locations closest to a predetermined image write start position by a predetermined and fixed delay time.

In the novel image forming apparatus a number of delay devices may be the same as a number of the light beams.

In the novel image forming apparatus one delay device may be provided for delaying each of the plurality of light beams.

The novel image forming apparatus may further include at least one delay device that delays each of the detection signals from the beam detecting device by an arbitrary time period which is predetermined individually for each of the detection signals, and that controls the image write start position of each of the light beams.

The delay device of the image forming apparatus may further include a first delay device that delays all of the detection signals from the beam detecting device by a same time period and a second delay device that delays each of the detection signals from the beam detecting device by an arbitrary time period which is predetermined individually for each of the detection signals. Further, the delay device can control each of image write start positions of the light beams according to each of delayed detection signals output from the second delay device.

Scanning operations of the plurality of light beams of the novel image forming apparatus can be performed by a rotary polygon mirror and the arbitrary time period of the delay device can be automatically set in response to a change of a rotation speed of the rotary polygon mirror.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 21 is a part of a block diagram showing an exemplary configuration of the image write start timing setting circuit, provided with a first delay device before the delay devices in FIG. 11.

DESCRIPTION OF THE PREFERRED EMBODIMENTS

Figure 1:
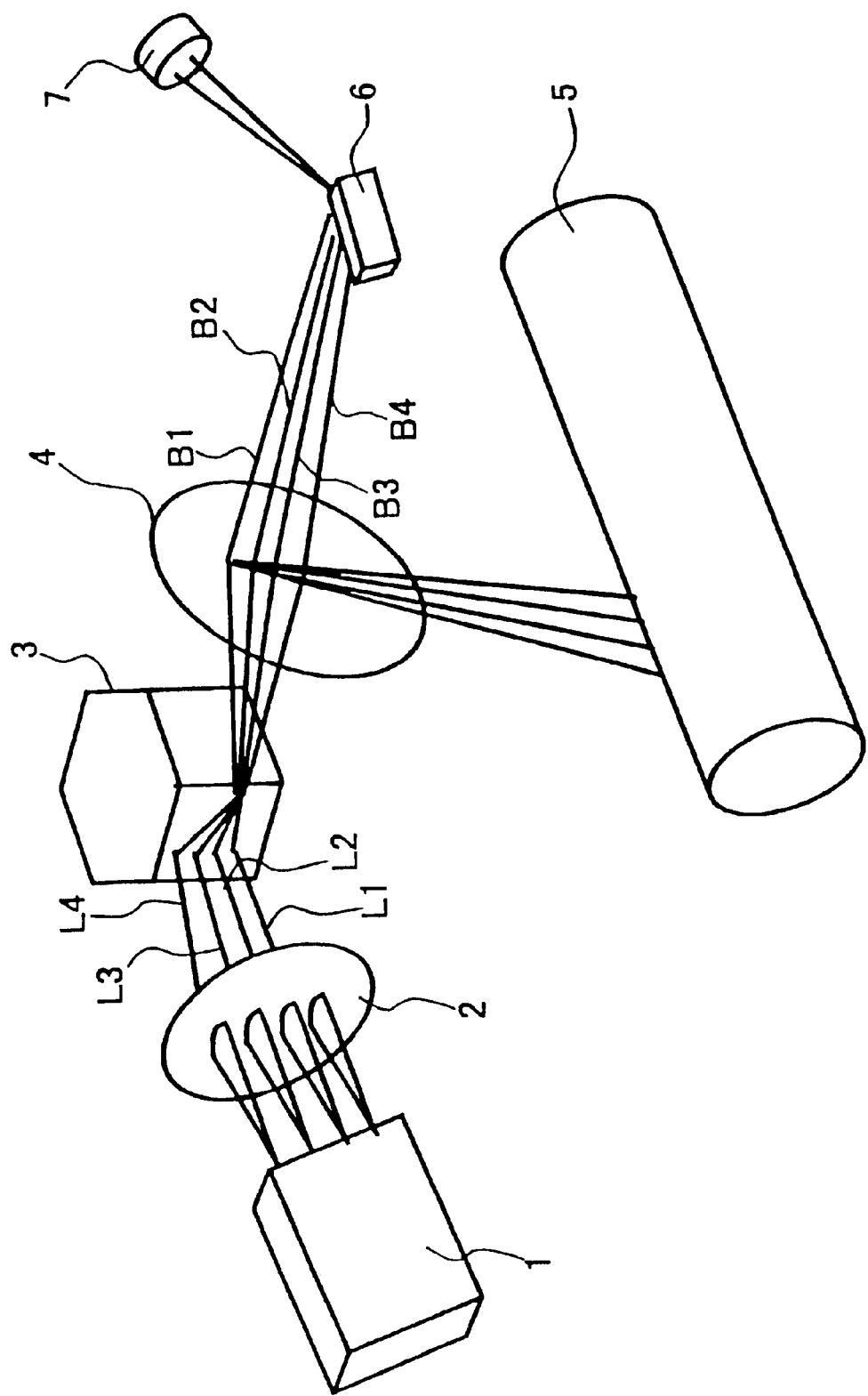
FIG. 1 is a schematic diagram illustrating an optical writing section of a multi-beam type image forming apparatus according to an embodiment of the present invention.

Embodiments of the present invention are described in detail referring to the figures, wherein like reference numerals indicate identical or corresponding parts throughout the several views.

FIG. 1 is a schematic diagram illustrating an optical writing section of a multi-beam type image forming apparatus according to an embodiment of the present invention.

In FIG. 1, the optical writing section is composed of a laser unit 1, a condenser 2, a rotary polygon mirror 3, an fθ lens 4, a photoconductive drum 5, a reflection mirror 6, and a beam detector 7.

The laser unit 1 is composed of a plurality of semiconductor laser emission devices (hereinafter referred to as laser diodes) located arow (in one line), and a laser array that emits, in this example, four laser beams. The condenser 2 refracts divergent beam light emitted from the laser unit 1 into parallel laser beams L1, L2, L3, and L4, and leads the laser beams L1–L4 to the rotary polygon mirror 3. The rotary polygon mirror 3 scans the incident laser beams L1, L2, L3, and L4 from the condenser 2 onto a surface of the photoconductive drum 5. The fθ lens 4 converts the laser beams deflected to a uniform angular velocity from the rotary polygon mirror 3 into a uniform scanning motion and makes an image on the photoconductive drum 5. The reflection mirror 6 is disposed at a tip end portion of the scanning line so that four laser beams B1, B2, B3, and B4 are led to the beam detector 7. At the beam detector 7, a signal corresponding to an incident laser beam when a laser beam is made incident to an edge of the beam detector 7 is output.

Figure 15:
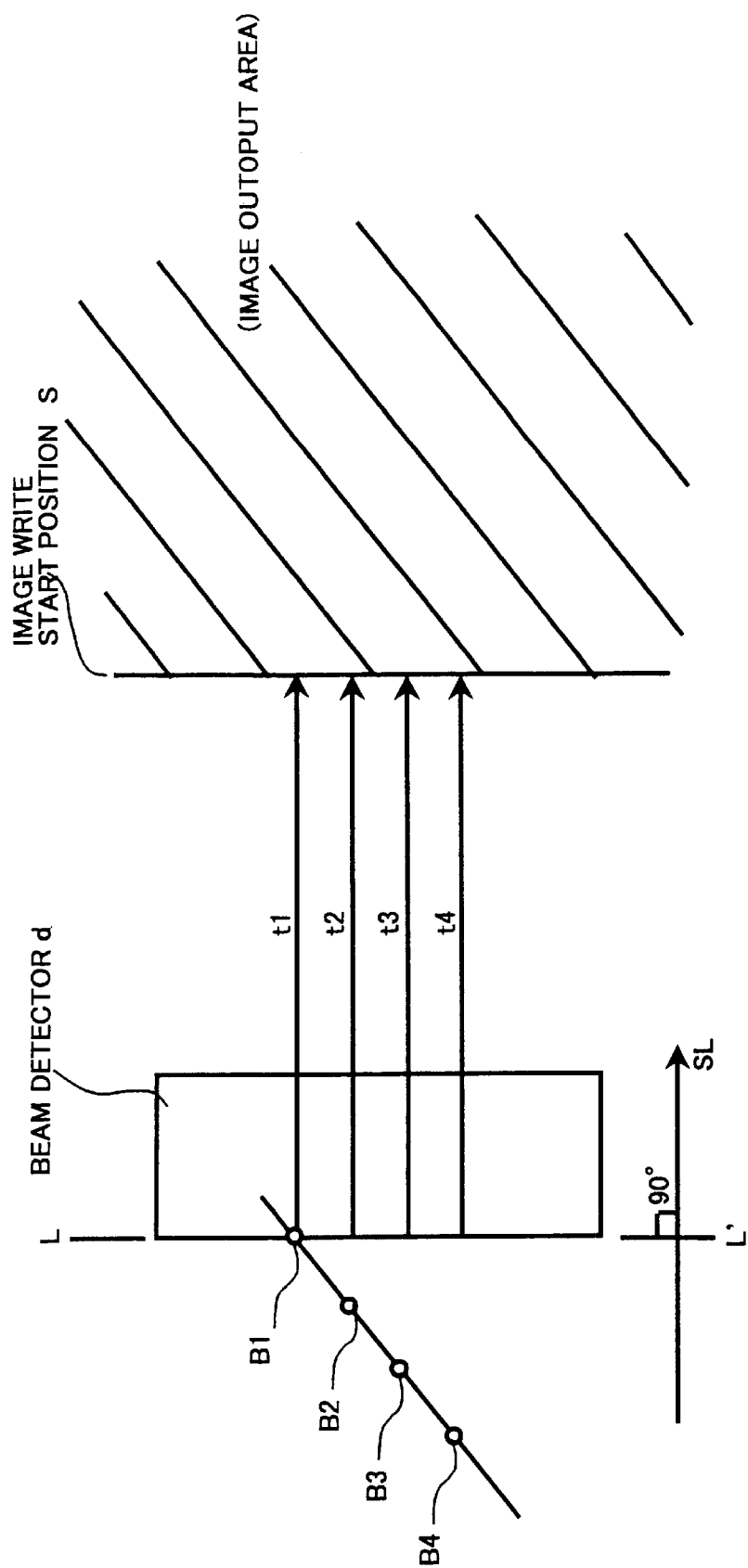
FIG. 15 is an explanatory view showing a relationship between a beam detector for detecting multi-beams and an image write start position in FIG. 14.
Figure 16:
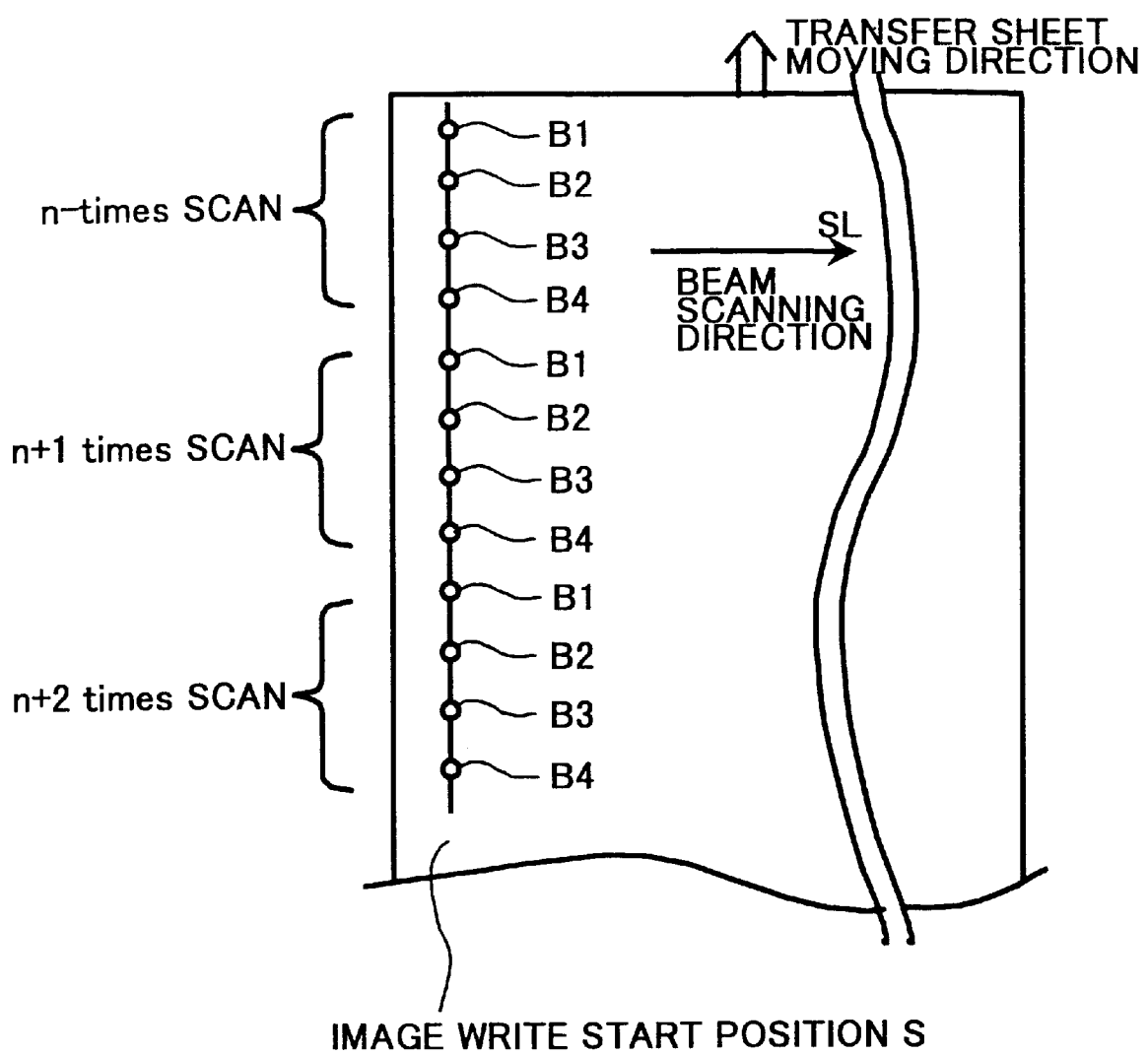
FIG. 16 is an explanatory view showing a state of a vertical line formed under the relationship between the beam detector for detecting multi-beams and the image write start position in FIG. 15.
Figure 19:
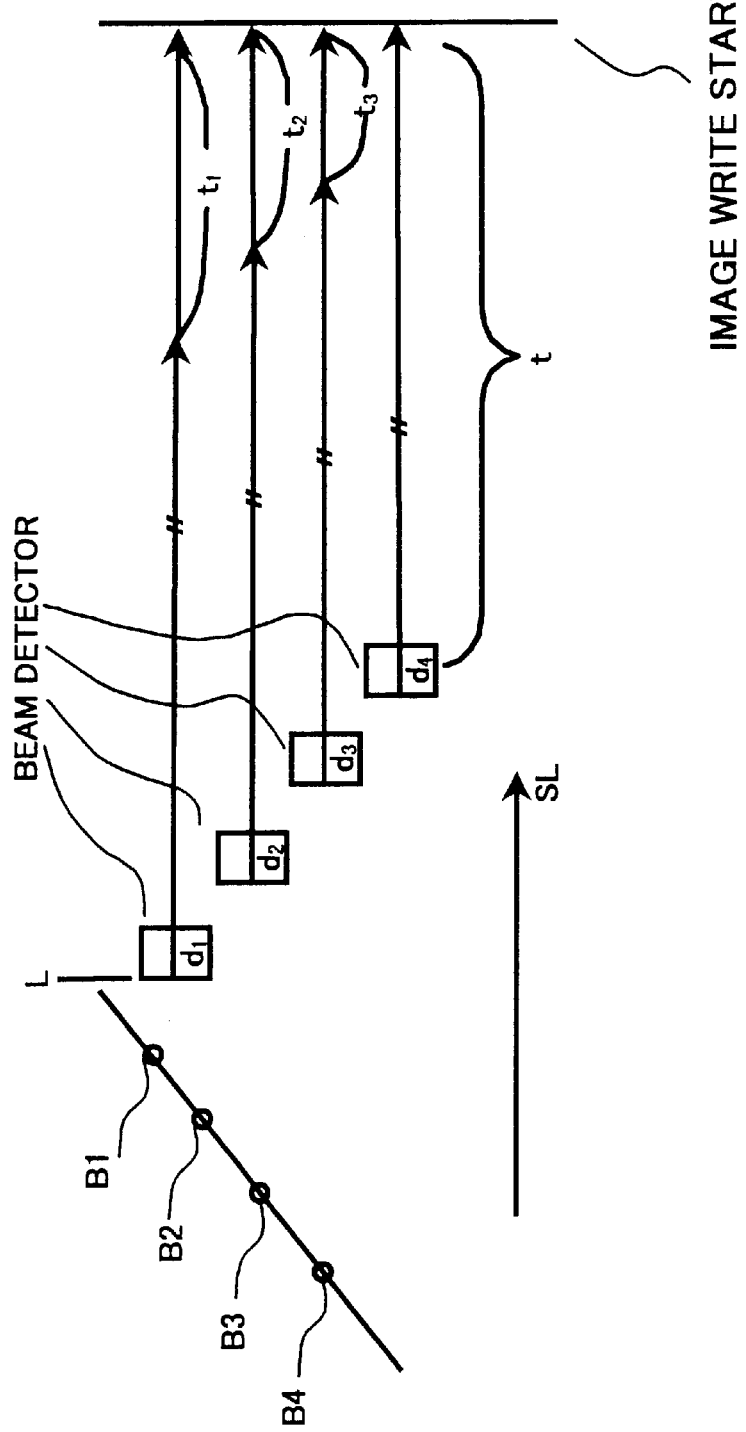
FIG. 19 is a diagram showing an exemplary relationship among positions of generating the laser beams B1–B4, locations of the beam detectors, and the image write start position when the image write start timing setting circuit includes the beam detectors.

As explained in the discussion of the background with reference to FIGS. 15 and 19, for the beam detector 7 (shown in FIG. 1), there are generally two types thereof. One type of beam detector is constructed such that a plurality of laser beams are detected by one beam detector. The other type of beam detector is constructed such that the laser beams are detected by a plurality of beam detectors provided for each laser beam. First, a case in which the laser beams are detected using the plurality of beam detectors is explained.

Figure 2:
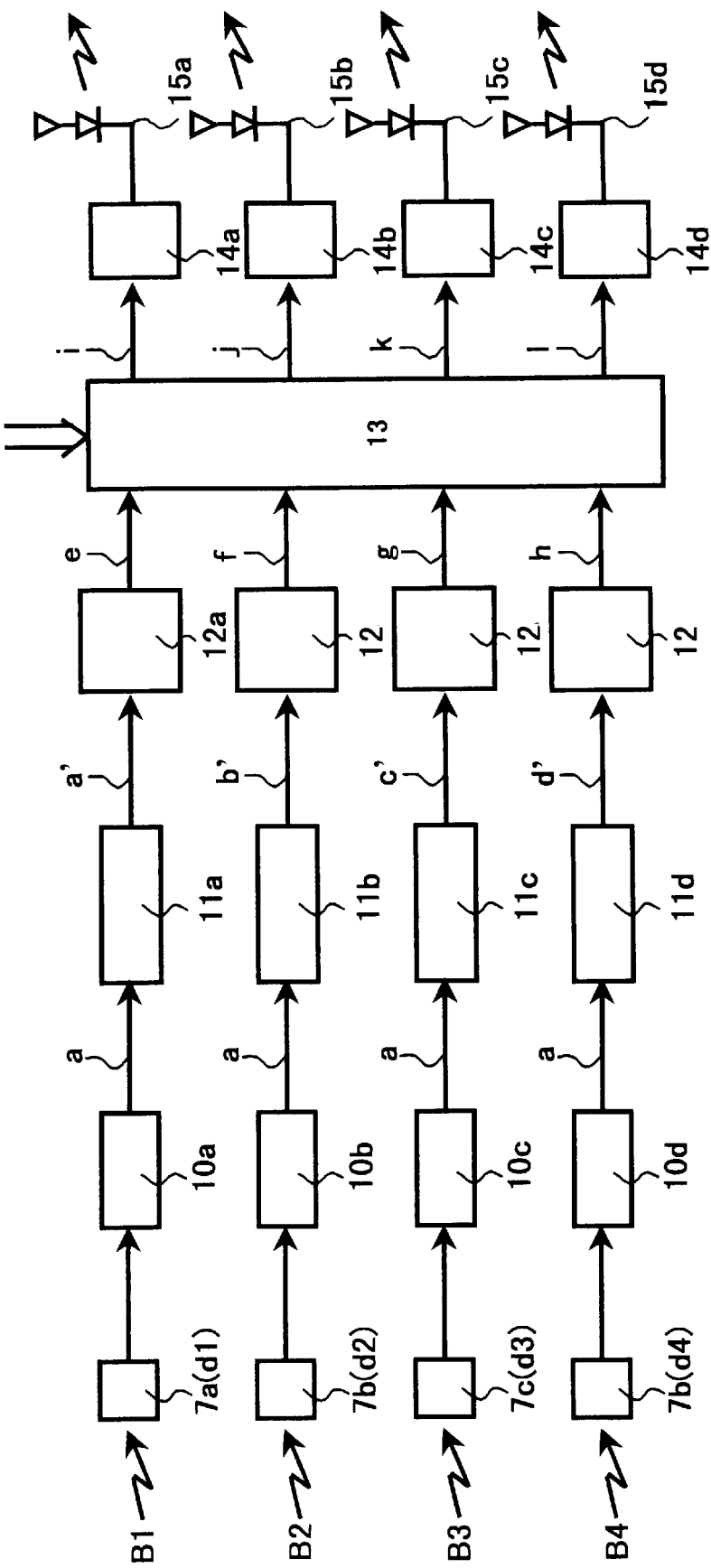
FIG. 2 is a block diagram showing an exemplary configuration of an image write start timing setting circuit of the image forming apparatus of FIG. 1, including beam detectors and delay devices.

FIG. 2 is a block diagram showing an exemplary configuration of an image write start timing setting circuit provided with a plurality of beam detectors 7a, 7b, 7c, 7d corresponding to the number of laser beams L1–L4 in the image forming apparatus according to the first embodiment of the present invention. In FIG. 2, output signals from each of the beam detectors 7a, 7b, 7c, and 7d are amplified at amplifiers 10a, 10b, 10c, and 10d. Further, each of the outputs of amplifers 10a, 10b, 10c, and 10d are individually delayed by delay devices (delay circuits) 11a, 11b, 11c, and 11d so that all the output signals are aligned at a virtual image write start position.

Reference clock signal generators 12a, 12b, 12c, and 12d generate reference clock signals synchronized with the timing signals (the aforementioned output signals from delay circuits 11a–11d) using the timing signals as trigger signals. The reference clock signals are input to a timing control circuit 13. The desired number of clock signals (corresponding to n clock signals in FIG. 3, as shown later) are counted at the timing control circuit 13, and if the image data is transmitted to LD drive circuits 14a, 14b, 14c, and 14d, the laser diodes 15a, 15b, 15c, and 15d are modulated. Thereafter, the image is formed by scanning the laser beams L1–L4 over the photoconductive drum 5 to expose the same as described earlier.

Further, in the aforementioned FIG. 19, each of the beam detectors corresponds to that in FIG. 2, i.e., d1 corresponds to 7a, d2 to 7b, d3 to 7c, and d4 to 7d, respectively. In the example in FIG. 19, the beam detector d1 is located furthermost from the image write start position S and the beam detectors are located closer to the image write start position S in the order of d2, d3, and d4 (d4 is the closest). In a case that the time when the laser beam B4 detected by the beam detector d4 is scanned by the rotary polygon mirror 3 and reaches the virtual image write start position S is defined as t, a delay amount t is set in the delay device 11d that corresponds to the beam detector d4.

In a manner as described above, the time differences corresponding to each of distances from the beam detectors d1, d2, and d3 to the virtual image write start position S, that is, t+t1, t+t2, and t+t3, are set in the delay devices 11a, 11b, and 11c. The image write start positions S are accurately aligned by using each of the delayed signals as trigger signals for generating the reference clock signals of each of the reference clock signal generators 12a–12d.

Figure 3:
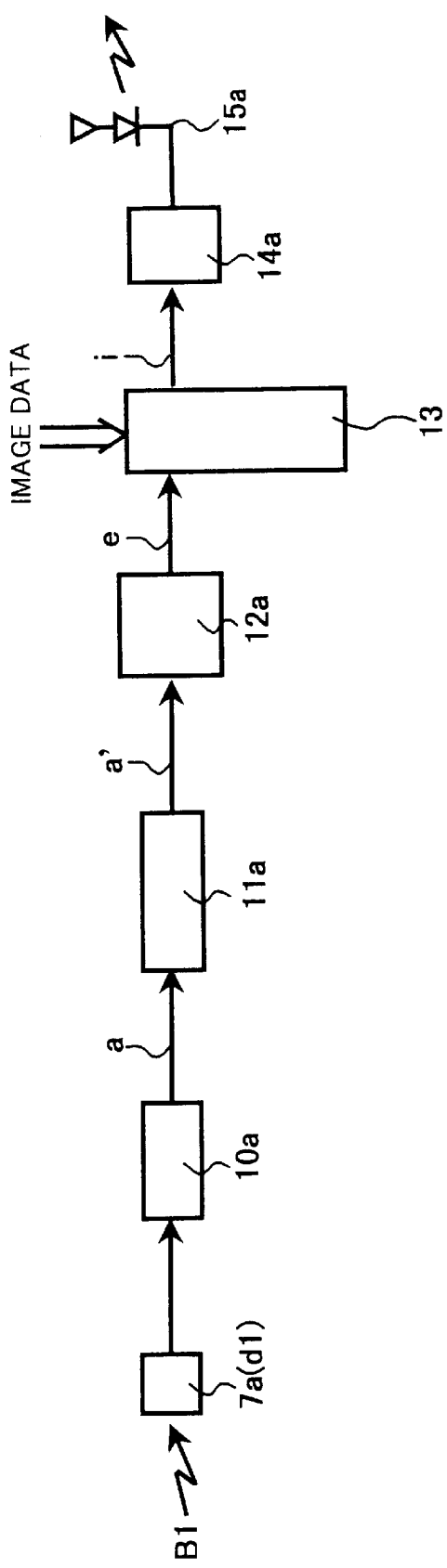
FIG. 3 is a part of the block diagram of FIG. 2 showing a circuit for a laser beam B1.
Figure 4:
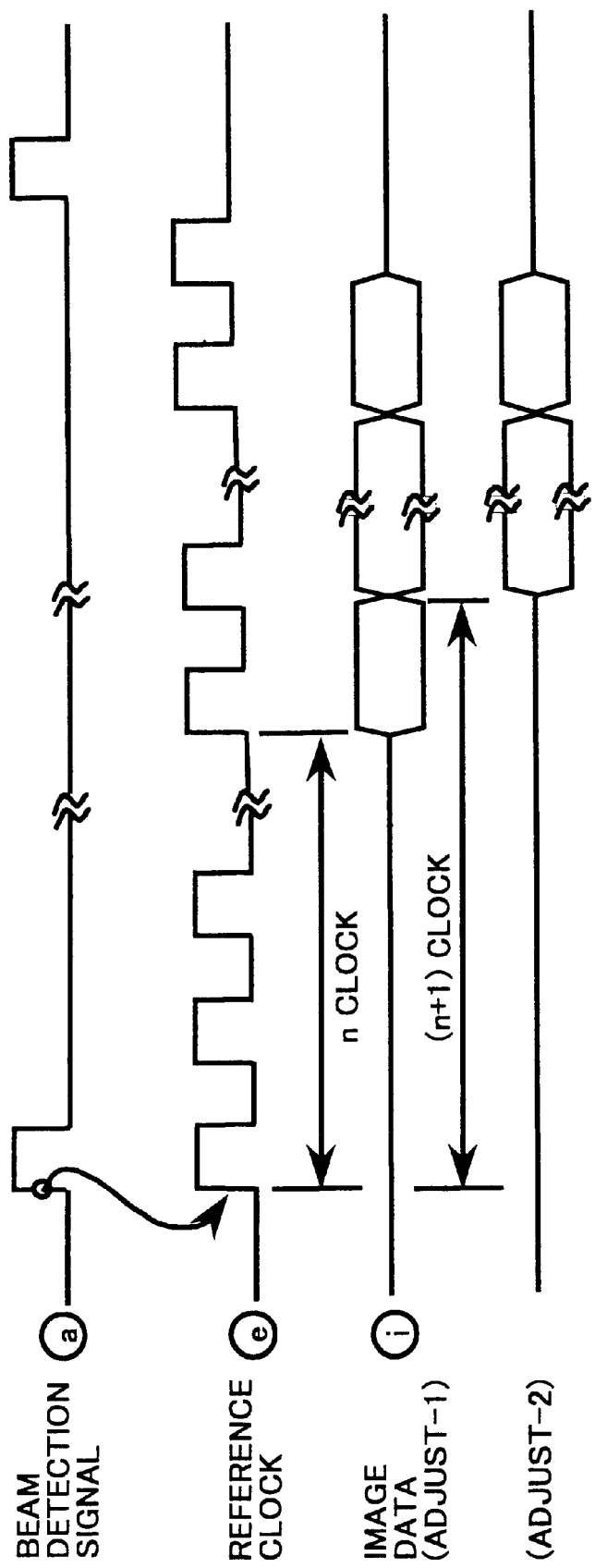
FIG. 4 is a time chart showing exemplary timing signals during an image forming timing control operation performed by the circuit of FIG. 3 when an adjustment control of an image write timing by a delay device is not applied.
Figure 5:
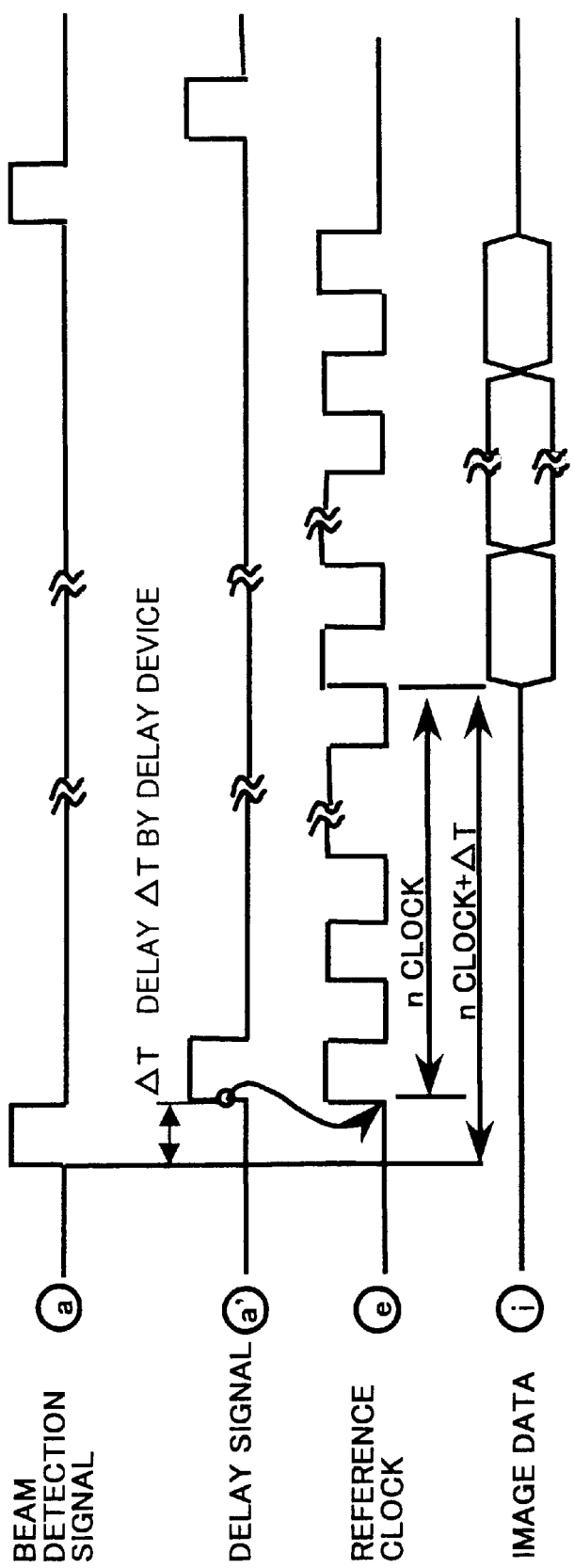
FIG. 5 is a time chart showing exemplary timing signals during an image forming timing control operation performed by the circuit of FIG. 3 when adjustment control of image write timing by a delay device is applied.

The above-described operation is explained in further detail referring to FIGS. 3 to 5. FIG. 3 is a part of the block diagram of FIG. 2 showing a circuit for one laser beam B1. A method for adjusting the image write timing by use of the delay devices 11a through 11d and the reference clock signal is now explained referring to FIG. 3.

Figure 18:
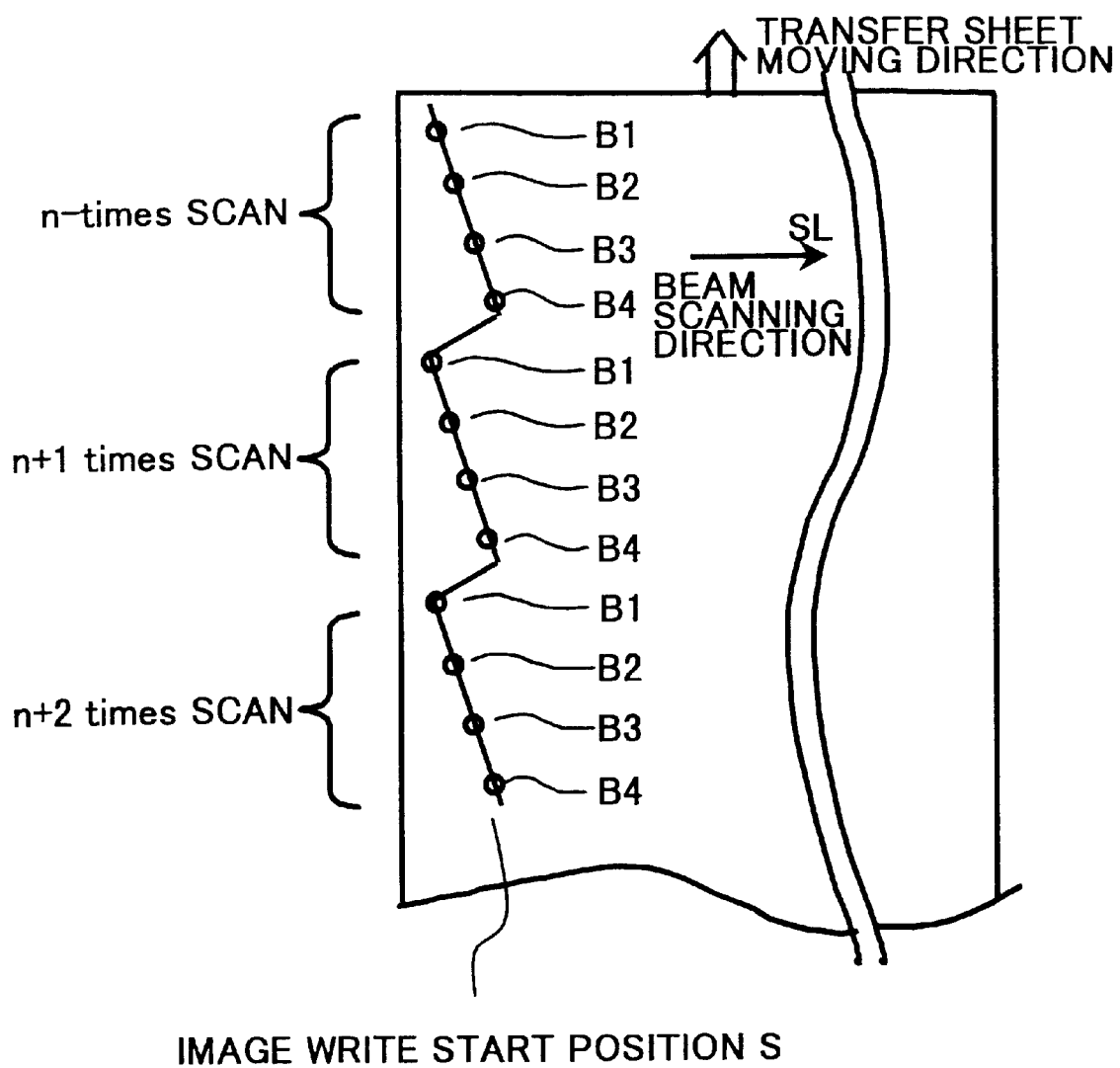
FIG. 18 is an explanatory view showing a state of a vertical line formed under the relationship between the beam detector for detecting multi-beams and the image write start position in FIG. 17.

In a case of an absence of the timing adjustment by the delay device 11a, only n clock signals or n+1 clock signals can be selected since the timing of writing images is controlled by counting clock signals of the reference clock signal (e), as shown in the timing chart of FIG. 4. Therefore, an error with a maximum value of one reference clock signal arises between the image write start positions to be written by the laser beams B2 through B4 and that to be written by the laser beam B1, and thereby, a deterioration of the image is caused due to the fluctuation of the vertical line within one reference clock signal, as shown in FIG. 18.

On the contrary, if the delay devices 11a through 11d are provided, as shown in FIGS. 2 and 3, since a delay time Δt can arbitrarily be set, as shown in a timing chart of FIG. 5, an arbitrary and slight adjustment of image write timing within one reference clock signal can be enabled by use of these delay devices 11a through 11d. Consequently, the image write start position S of the other laser beams B2 through B4 can be adjusted with a good accuracy, and the image can be prevented from deteriorating.

To be able to adjust the image write position S as mentioned above can be a significant and important factor for a color image forming apparatus that forms an image by superimposing a plurality of color images upon one another as an accurate superimposing operation improves image formation. Further, in the related art, since an output level of the beam detector is used for adjusting the image write start position S, a power variation of the laser diode affects the beam detector output level, and a fluctuation of the image write start position S thereby tends to occur.

Furthermore, since an edge portion of a rise time of a variation of the beam detector output or a fall time of the same is used for detecting the timing of the output signal, a time range other than this time range cannot be used for adjusting the image write start position S. Moreover, since the reference clock signal with a significantly higher frequency than a pixel clock signal is used, electric noise tends to occur in the related art.

However, the present invention has an advantage such that an arbitrary slight adjustment of image write position can be performed with a digital signal, and that since the reference clock signal has a frequency higher than that of a pixel clock signal, occurrence of noise is decreased in the control circuit.

Figure 6:
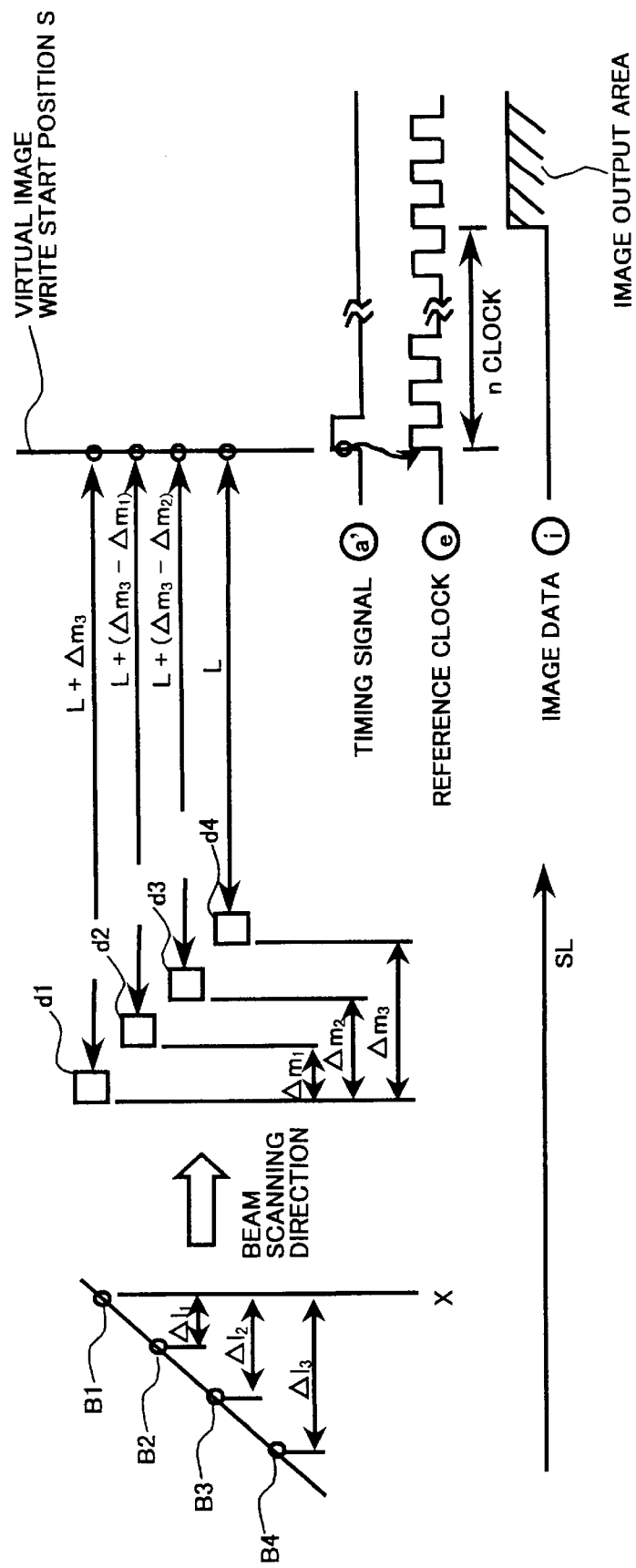
FIG. 6 is a diagram showing exemplary relationships among positions of generating laser beams B1–B4, locations of beam detectors, and an image write start position when an image write start timing setting circuit includes beam detectors.
Figure 7:
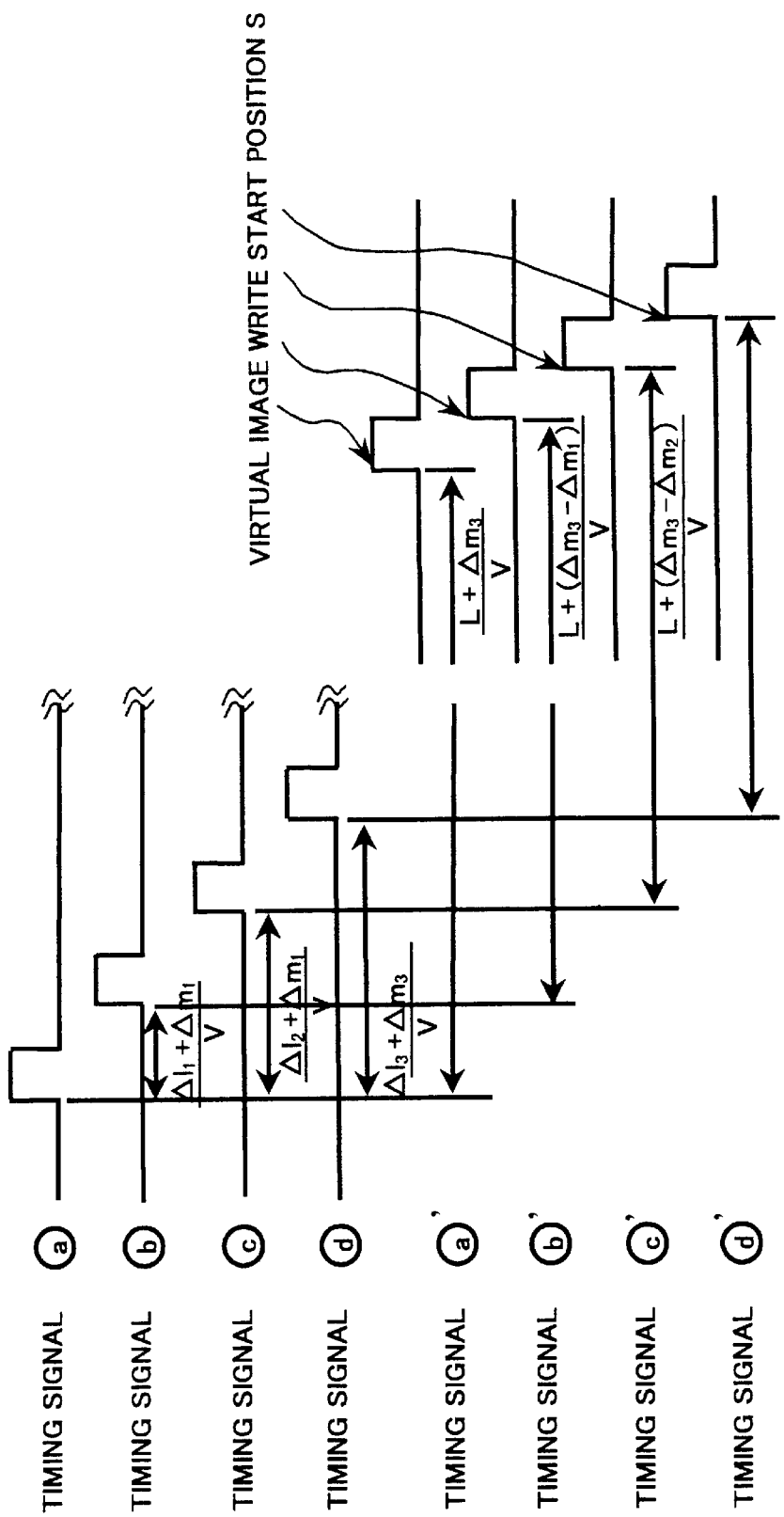
FIG. 7 is a time chart showing relationships between beam detection timing signals and image write start timing signals by which an image write start position can be aligned straight when positions of generating the laser beams B1–B4, locations of beam detectors, and an image write start position have relationships of FIG. 6.

FIG. 6 is a diagram showing exemplary relationships among positions of generating the laser beams B1, B2, B3, and B4, and locations of the beam detectors, d1, d2, d3, and d4 in a mechanical manner. When there are distances $\Delta l1$ (delta el one), $\Delta l2$, $\Delta l3$ between pairs of the laser beams B1 and B2, B1 and B3, and, B1 and B4, respectively in the beam scanning direction SL, and there are also distances $\Delta m1$, $\Delta m2$, $\Delta m3$ between the beam detectors d1 and d2, d1 and d3, and, d1 and d4, the image write start position S can be aligned by setting delay timings indicated by a timing chart, as shown in FIG. 7.

Namely, in a case that the distances between each of the laser beams and the distances between each of the beam detectors are configured to be in the aforementioned relationship, and the beam scanning speed is set to v, the laser beam B2 reaches the beam detector d2 after a time $(\Delta l1 + \Delta m1)/v$ from the time when the laser beam B1 passes the beam detector d1. In a same manner, the laser beam B3 reaches the beam detector d3 after a time $(\Delta l2 + \Delta m2)/v$ from the time when the laser beam B1 passes the beam detector d1, and the laser beam B4 reaches the beam detector d4 after a time $(\Delta l3 + \Delta m3)/v$ from the time when the laser beam B1 passes the beam detector d1, respectively. The beam detectors d2, d3, and d4 then output the beam detection signals, respectively.

On the other hand, since there are positional deviations $\Delta m1$, $\Delta m2$, and $\Delta m3$ from each of the beam detectors d1, d2, d3, and d4 to the virtual image write start position S, time differences corresponding to each of the positional deviations are required to be set so that the image write start positions S of the respective laser beams B1, B2, B3, and B4 are aligned. Accordingly, the image starts to be written after a time L/v from a time when the laser beam B4 is detected with the beam detector d4, wherein L is defined as the distance between the beam detector d4, which is located closest to the virtual image write start position S out of the beam detectors d1 through d4.

The time L/v is set to the delay device 11d corresponding to the laser beam B4 in FIG. 2. In a same manner, the distances from each of the beam detectors d1, d2, and d3 to the image write start position S are $L+\Delta m3$, $L+(\Delta m3-\Delta m1)$, and $L+(\Delta m3-\Delta m2)$, respectively. Further, the delay times are $(L+\Delta m3)/v$, $\{L+(\Delta m3-\Delta m1)\}/v$, and $\{L+(\Delta m3-\Delta m2)\}/v$, respectively, as also shown in FIG. 7. Furthermore, FIG. 6 and FIG. 19 correspond to each other in relation to the laser beams B1 through B4, when each of the elements are replaced as follows:

$L/v = t$, $\Delta m3 = t1$, $(\Delta m3 - \Delta m1)/v = t2$, and $(\Delta m3 - \Delta m2)/v = t3$ If the delay devices 11a through 11d are thus used, a time adjustment, namely, an adjustment of the image write start position S slightly less than one clock signal of the reference clock signal can be performed without using the reference signal with relatively high frequency to control the image write start position S as used in the background art. Thus, a correction for the slight deviation of the image write start timing caused by the deviation of the position of each of the beam detectors d1, d2, d3, and d4 can be implemented by properly setting each of the values t, t1, t2, and t3.

Figure 8:
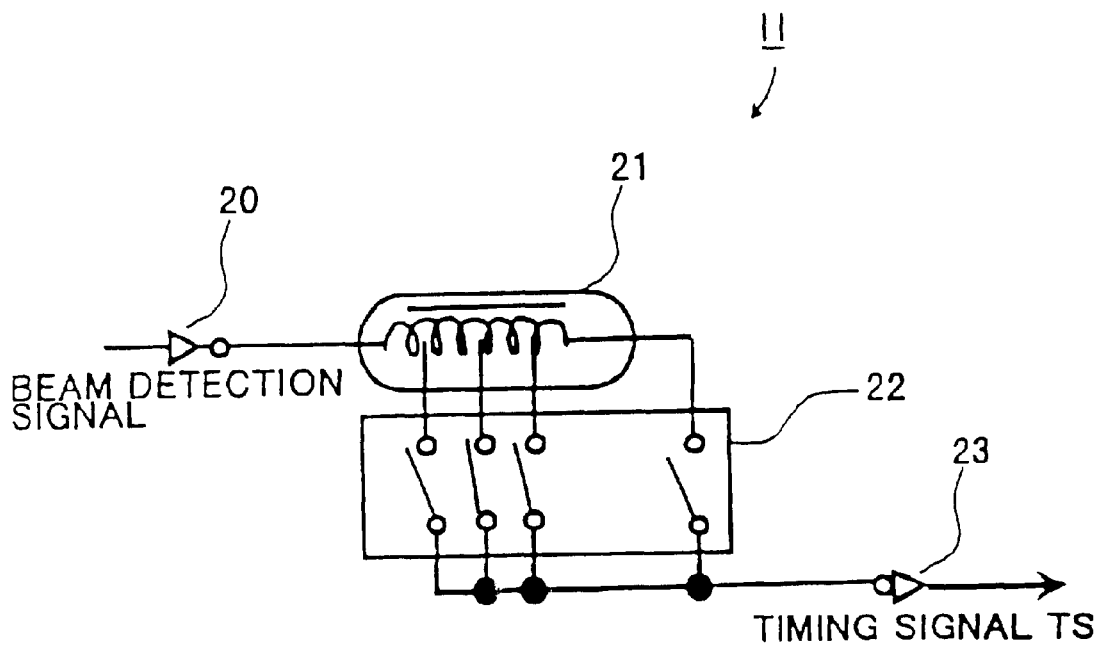
FIG. 8 is an electric diagram illustrating an exemplary configuration of the delay device of FIG. 2.

FIG. 8 is an electric diagram illustrating an exemplary configuration of the delay devices 11 of FIG. 2. The delay device 11 is composed of a delay element 21 and a switch 22. Buffer elements 20 and 23 are respectively mounted at an input side of the delay element 21 where a beam detection signal BS is input and an output side of the switch 22 where the delayed timing signal is output.

Figure 9:
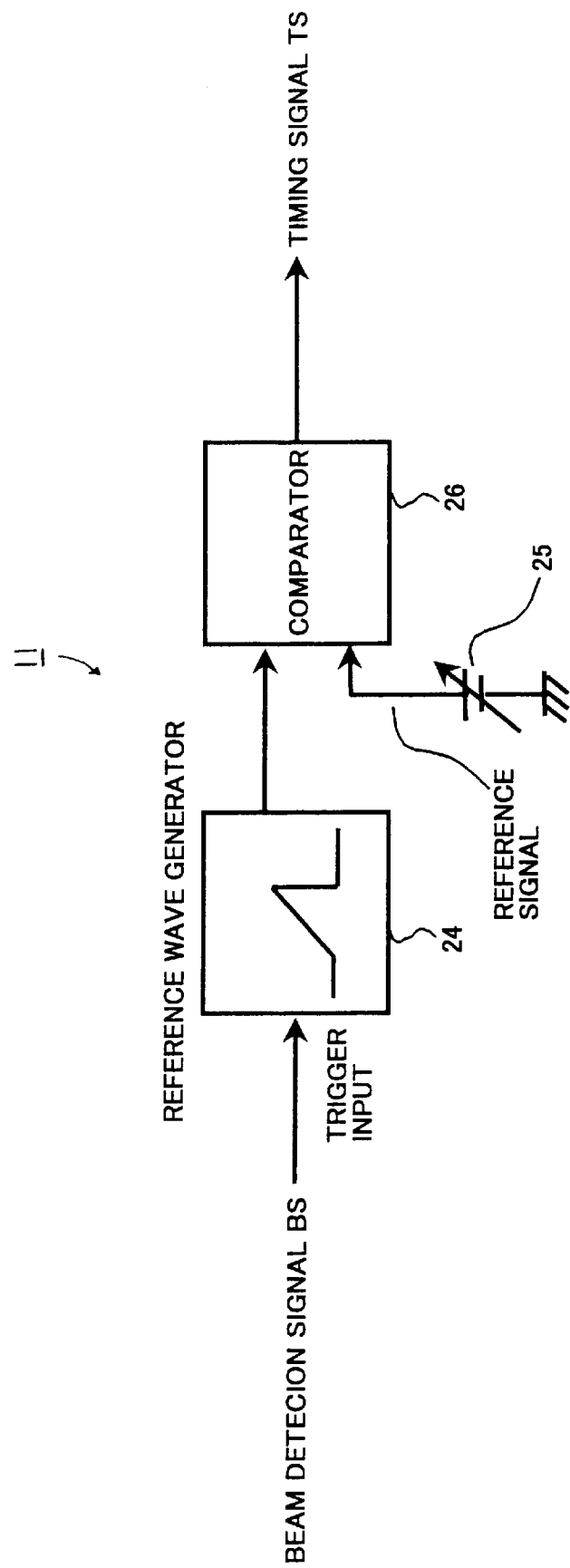
FIG. 9 is an electric diagram illustrating another exemplary configuration of the delay device of FIG. 2.

FIG. 9 is an electric diagram illustrating another exemplary configuration of the delay devices 11 of FIG. 2, composed of a reference signal generator 24 that generates a reference signal, for example a triangular wave that arises by the beam detection signal BS as a trigger signal, a fundamental signal generator 25, and a comparator 26.

Figure 10:
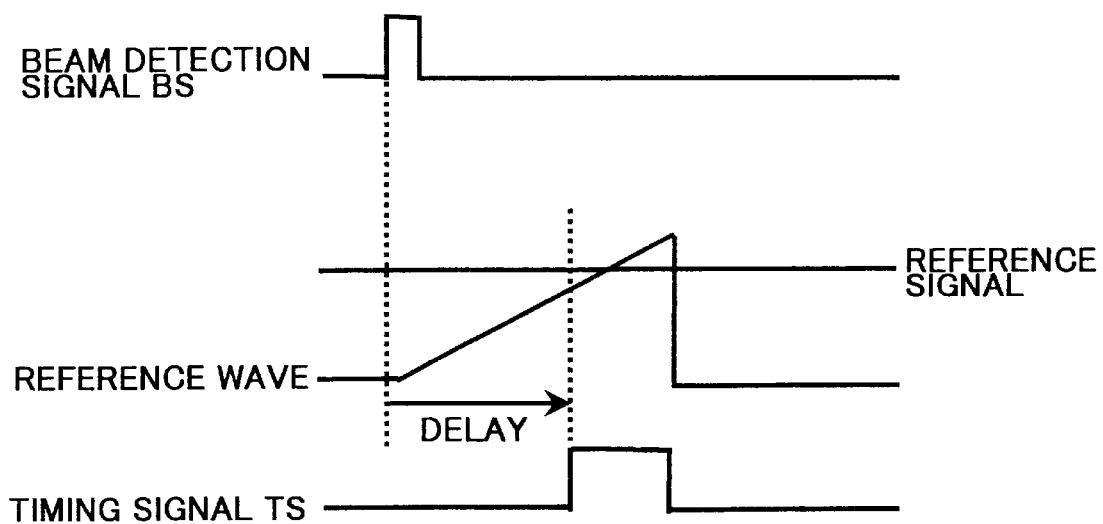
FIG. 10 is a time chart showing a relationship among a beam detection signal, a reference signal, and a timing signal to be input to the delay device in FIG. 9.

In this composition of FIG. 9, the reference wave generator 24 generates the reference wave with the beam detection signal BS as a trigger. The generated reference wave and the fundamental signal generated at the fundamental signal generator 25 are compared in the comparator 26, as shown in the timing chart of FIG. 10. The timing signal is generated only when the reference wave exceeds the fundamental signal. Hereupon, a fundamental signal voltage can be set so that a desired delay time is obtained.

When the delay device 11 is thus constructed, since the delay time can be set in an analog-like manner and a slight adjustment of the delay time can arbitrarily be performed, this type of delay device is advantageous to use for the slight adjustment of the delay time. Further, the image write start position S can be adjusted by adjusting the delay times t1, t2, and t3, by setting a time t, which is required for scanning an area from the beam detector d4 to the image write start position S as a fixed value, depending on the distance between each of the four laser beams. This results because the beam detector d4 is closest to the image write start position S from among the beam detectors d1, d2, d3, and d4 shown in FIGS. 6 and 19, and the setting delay time t for d4 is the shortest.

Thereby, the circuit with regard to setting the delay time for the beam detector d4 can be omitted, and an entire circuit construction can be simplified. Furthermore, since the aforementioned values t1, t2, t3, and t4 are approximately determined mainly depending on a positional location of the laser array, the beam detectors, and so forth, or on a rotational accuracy of the rotary polygon mirror, the value can be set before shipment. Furthermore, the aforementioned fixed value can include "0".

Figure 11:
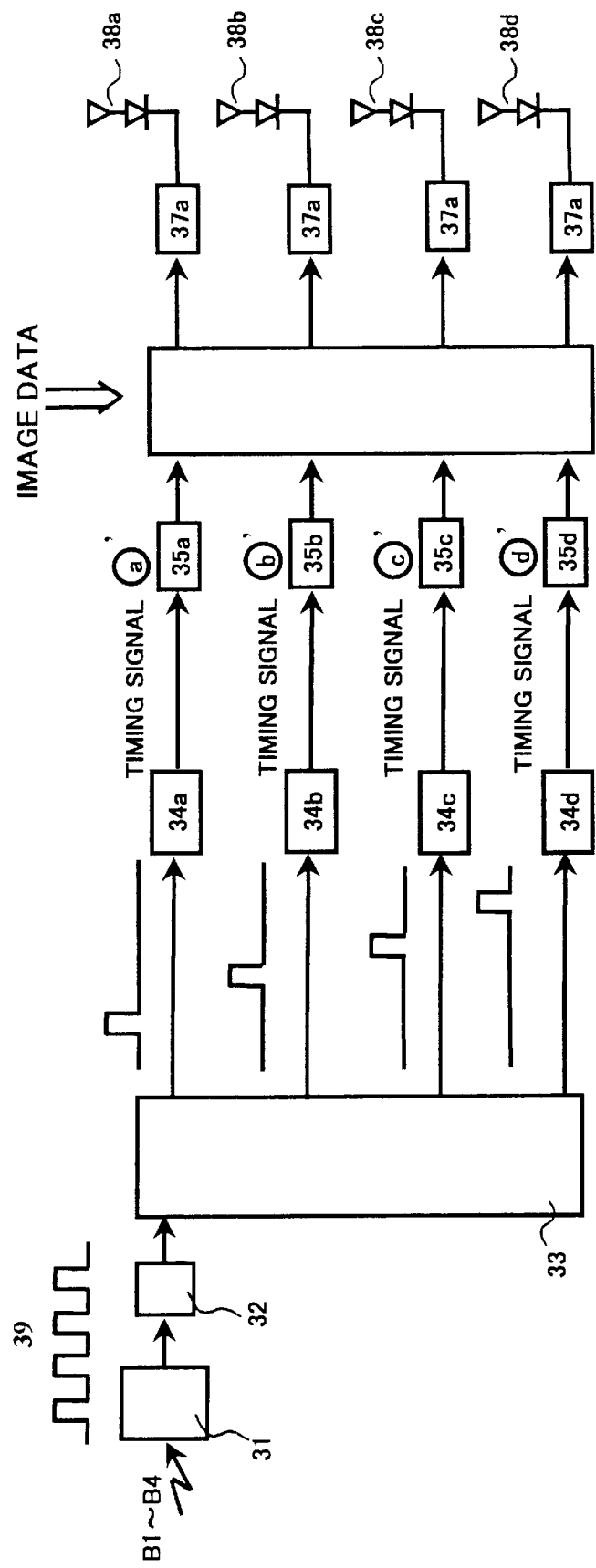
FIG. 11 is a block diagram showing an exemplary configuration of an image write start timing setting circuit of the image forming apparatus of FIG. 1, for detecting a scanning timing of a plurality of laser beams using one beam detector according to another embodiment of the present invention.

FIG. 11 is a block diagram showing an embodiment in which a plurality of laser beams are detected with one beam detector.

In this embodiment of FIG. 11, the setting operation for the beam detection and timing of the beam detection signals is performed by a beam detector 31, an amplifier 32, a beam detection signal separator 33, and delay devices 34–34d that output delay timing signals based on the beam detection signal that is separated by the beam detection signal separator 33.

In this composition, when each of the laser beams B1 to B4 reaches the edge of the beam detector 31, the output signal from the beam detector 31 is amplified by the amplifier 32. In this instance, the beam detection signal in this embodiment is a progressive signal that progresses in a time difference according to the beam distance that is shown by a numeral 39. This signal is input to the beam detection signal separator 33, and is separated into the signals corresponding to each of the aforementioned laser beams B1, B2, B3, and B4 by the beam detection signal separator 33, to be used as a timing signal.

Each of the signals is input to the delay devices 34a, 34b, 34c, and 34d in which desired delay times are set, and each of the timing signals are generated. Then, the reference clock signals that are synchronized with the aforementioned timing signals are generated at reference clock signal generating circuits 35a, 35b, 35c, and 35d on the basis of the timing signals a, b, c, and d. Thereafter, each of the image write start positions S is determined on the basis of each of the reference clock signals.

Figure 17:
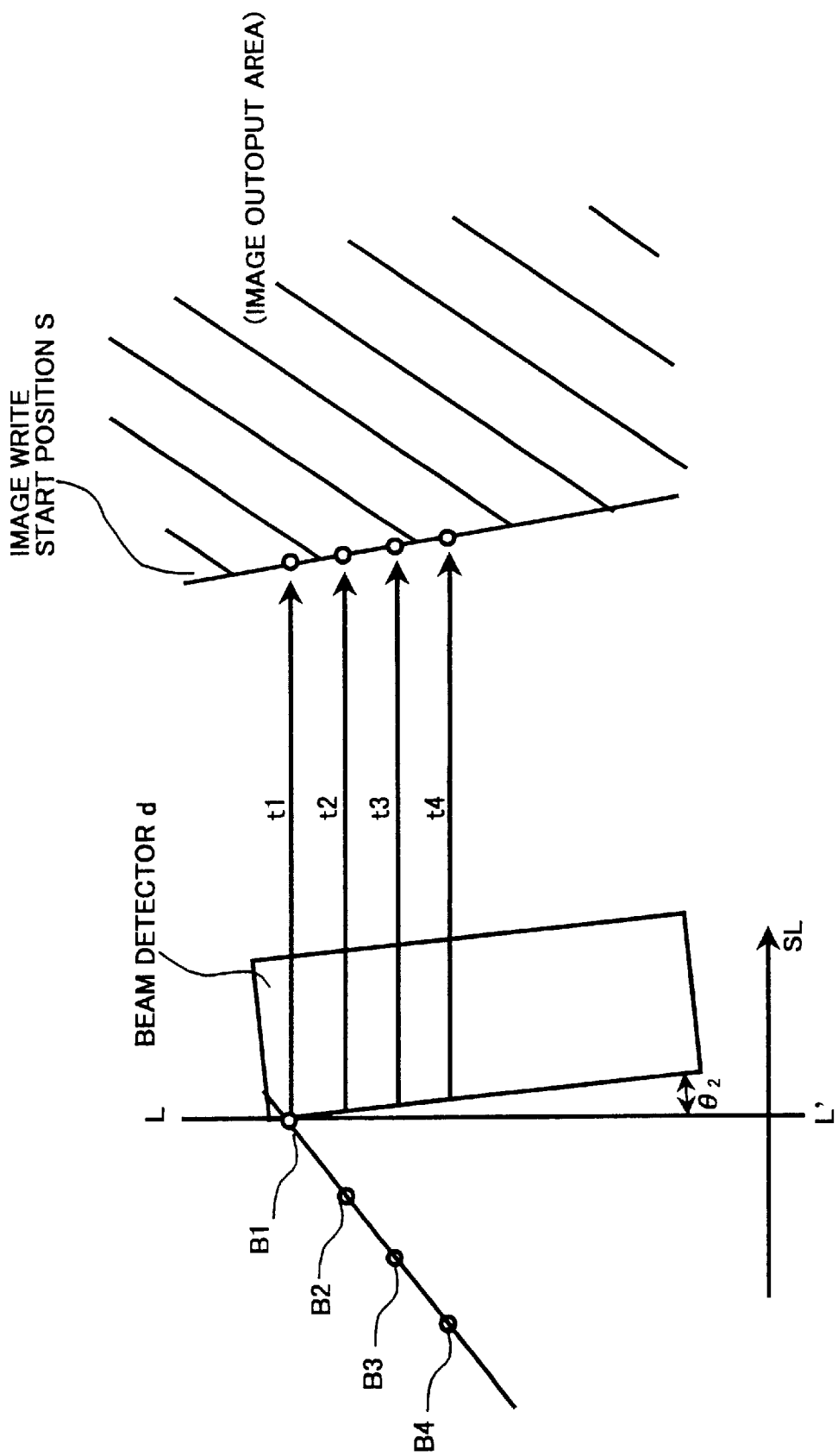
FIG. 17 is an explanatory view showing a relationship between the beam detector for detecting multi-beams and the image write start position in a case that the beam detector is mounted in an inclined manner.

Hereupon, the set time for the delay devices 34a, 34b, 34c, and 34d is set, for example, in the aforementioned FIG. 17, by adding each of time differences caused by an inclining angle θ2 of an edge of the beam detector 31 to a delay time for registration (the delay time for registration is the same value for each of the laser beams respectively). Thereby, the image write timing position is aligned for each of the beam detection signals. Further, a setting manner for the delay time after the beam detection signal separator 33 is basically constructed the same as in the case in FIGS. 8 and 9 in which the aforementioned plurality of beam detectors 7a through 7d are used.

Figure 12:
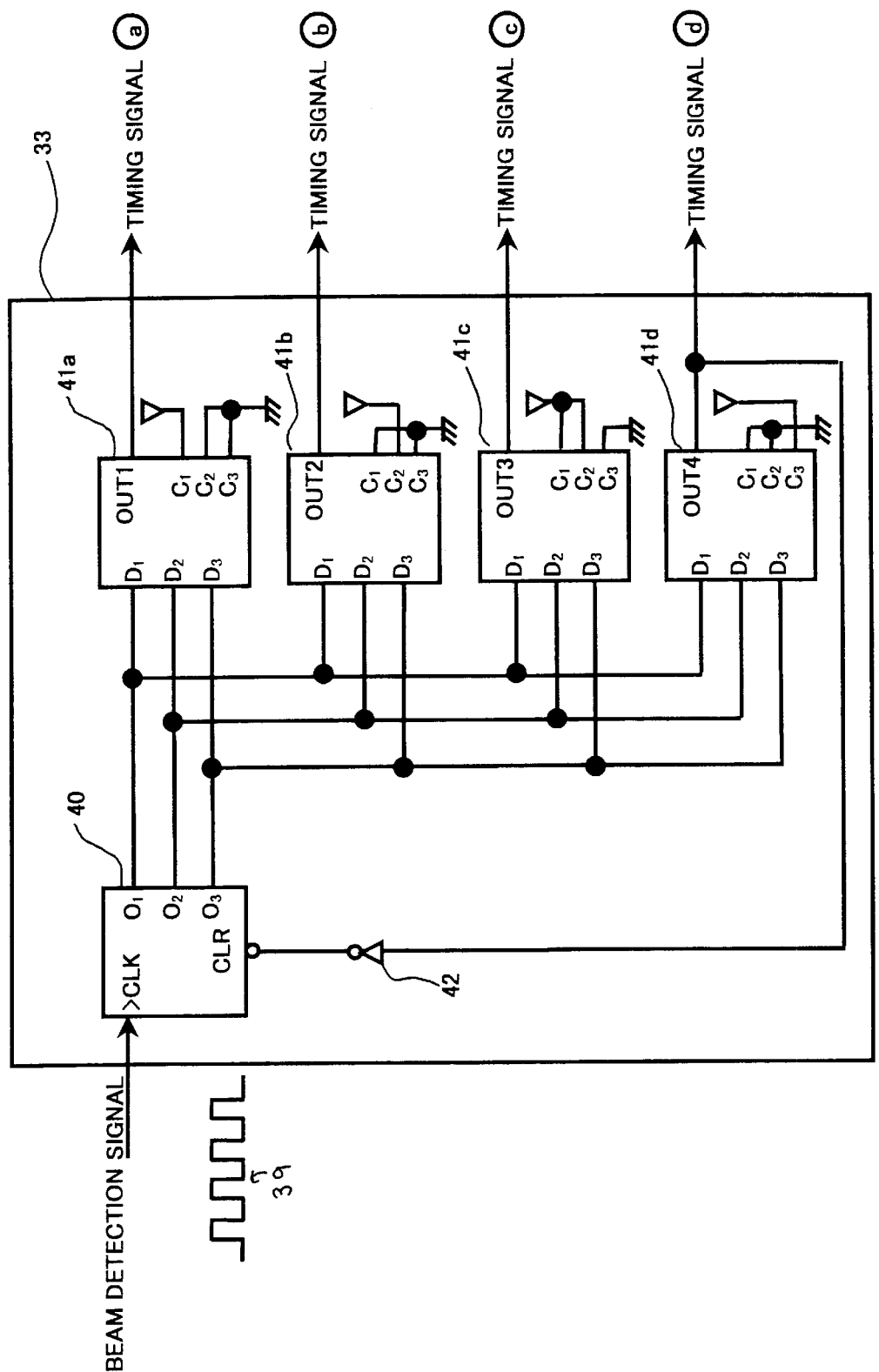
FIG. 12 is a block diagram showing an exemplary configuration of a beam detection signal separator in the image write start timing setting circuit in FIG. 11.

In this embodiment of FIG. 11, the beam detection signal separator 33 is constructed in a manner as shown in FIG. 12. That is, the beam detection signal separator 33 is composed of a counter 40, alignment detection circuits 41a, 41b, 41c, and 41d, and an inversion element 42. In this composition, when a beam detection signal 39 that is amplified by the amplifier 32 is input to the counter 40, a count up operation is sequentially performed, and the result is output from each of the terminals O1, O2, and O3.

Figure 13:
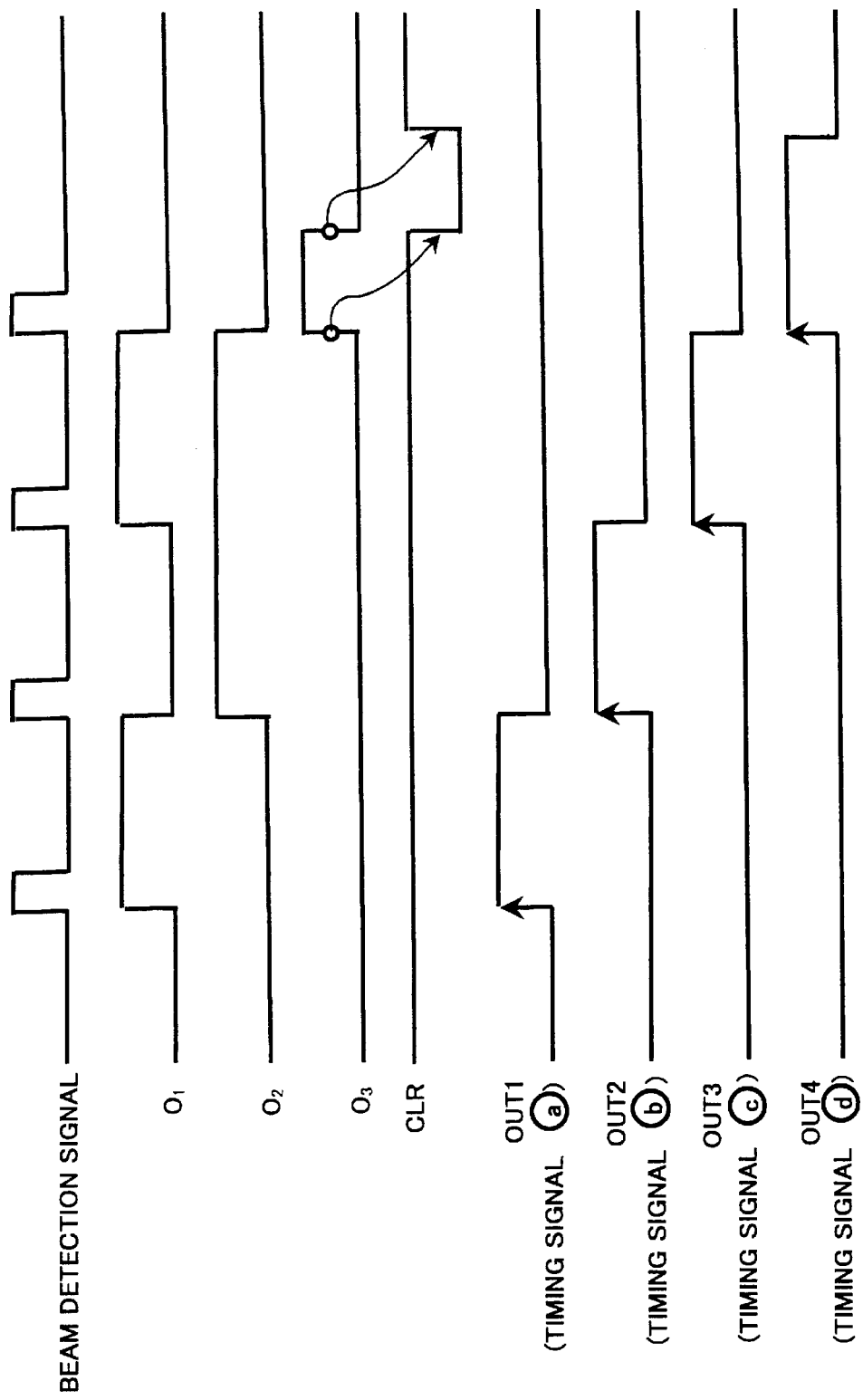
FIG. 13 is a timing chart showing an exemplary operation timing of each of beam detection signals and timing signals of the beam detection signal separator in the image write start timing setting circuit in FIG. 12.
Figure 14:
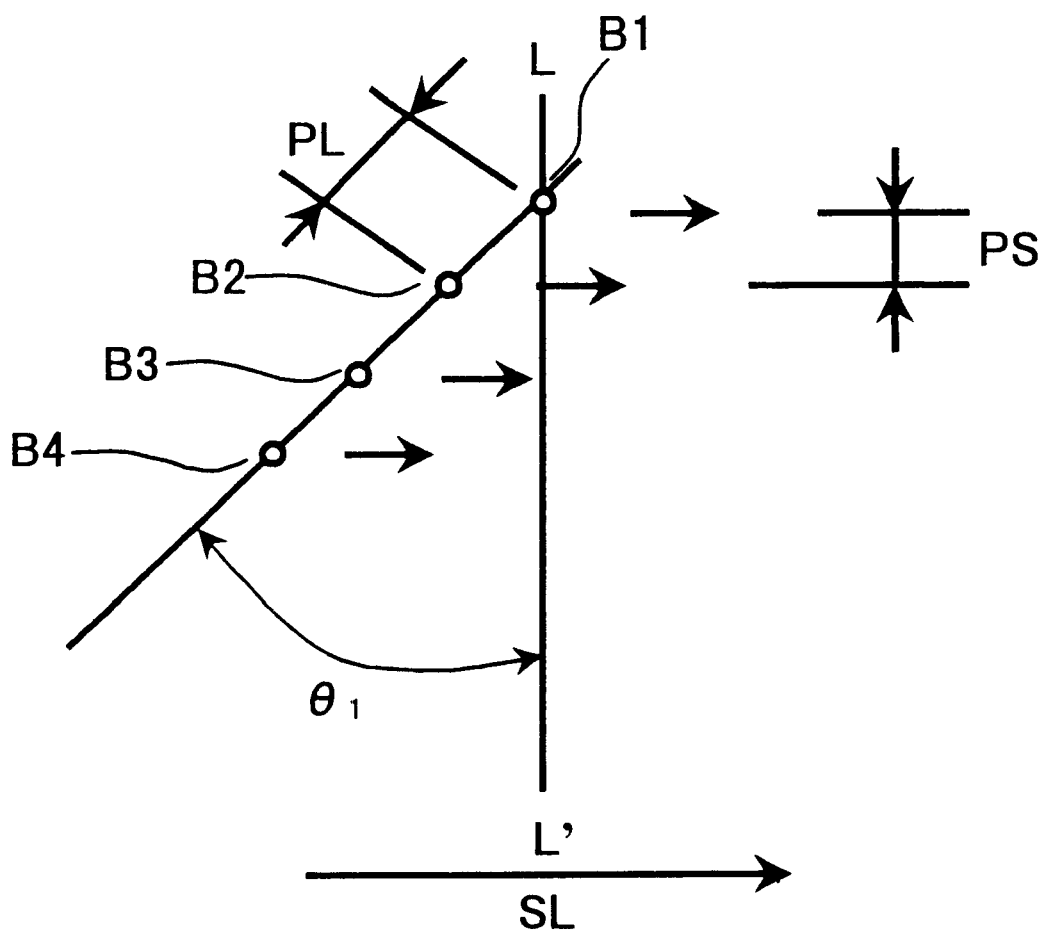
FIG. 14 is an explanatory view showing a positional deviation of multi-beams in a scanning direction.

Each of these outputs are then input to each of terminals D1, D2, and D3 of each of the alignment detection circuits 41a, 41b, 41c, and 41d, and if the result is aligned to each of the setting values C1 through C3, an alignment signal is output from each of the output terminals OUT1, OUT2, OUT3, and OUT4 as a timing signal. The output timing is shown in FIG. 13. As is apparent from FIG. 13, in a case that the result of the counter 40 is "1", the data is aligned with the set data of the alignment detection circuit 41a, and the alignment detection circuit 41a outputs 1 (level "high") to the output terminal OUT1.

If the next beam detection signal is input to the counter 40, the count up operation is performed, and the result of the counter becomes "2". At this time, the data aligns with the set data of the alignment detection circuit 41b, and the alignment detection circuit 41b outputs 1 (level "high") to the output terminal OUT2. Further, if the next beam detection signal is input to the counter 40, the count up operation is performed, and the result of the counter becomes "3".

At this time, the data aligns with the set data of the alignment detection circuit 41c, and the alignment detection circuit 41c outputs 1 (level "high") to the output terminal OUT3. The count up operation and the alignment detecting operation is performed, and when the fourth beam detection signal is finally input to the counter 40, the alignment detection circuit 41d outputs 1 (level "high") to the output terminal OUT4, and at the same time, an input-inversion output from the inversion element 42 is input to the clear terminal of the counter 40. Thereby, the counter 40 is reset and awaits the next beam detection signal returning to the initial value 0 (level "low").

As for the timing signal, since a rising edge of the beam detection output signal is accurately aligned with the beam detection signal, the rising edge is used for the timing signal, even though the widths of the signals are different from each other. Thus, a plurality of beam detection signals can be separated.

Further, in the aforementioned embodiment shown in FIG. 17, since the beam detector is located inclined at the angle θ2 to the beam scanning direction LS, the distance between the position where the laser beam B4 is detected by the beam detector and the image write start position S is brought to be shorter than the case of the other laser beams B1 through B3, and the delay time to be set with the delay device 34d becomes minimum. Therefore, the image write start position S can be adjusted by only adjusting the delay times t1, t2, and t3 by setting the setting time t of the delay device 34d to a fixed value (which includes 0). Thereby, the circuit relating to set the delay time of the delay device 34d can be omitted, and the entire circuit construction can be simplified.

On the other hand, recently, there have been some image forming apparatuses in which an image data output speed thereof can variably be set at manufacture, or the resolution thereof can be changed by a user setting. In this kind of image forming apparatus, the image output speed or the resolution can be changed by changing a process condition based on the change of the rotation speed of the rotary polygon mirror 3. Accordingly, when the rotation speed of the rotary polygon mirror 3 is changed, since the scanning speed v of the laser beams B1 through B4 is changed, the set delay times t, t1, t2, and t3 are required to be changed according to each of the conditions.

Namely, if the rotation speed of the rotary polygon mirror 3 is set 10% faster, the image write start position S can be aligned by changing the set delay times t, t1, t2, and t3 to be 10% shorter.

Figure 20:
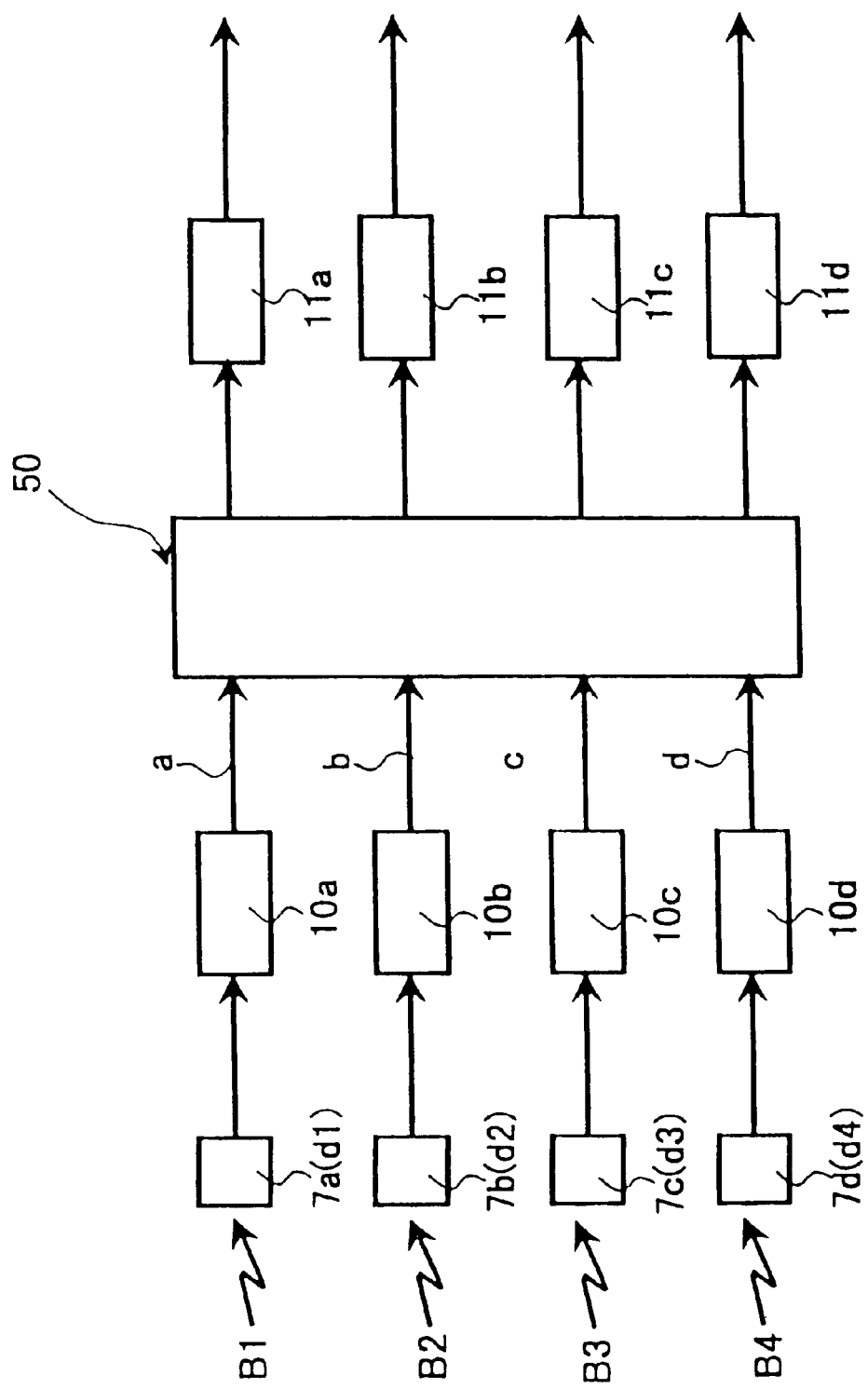
FIG. 20 is a block diagram showing an exemplary configuration of the image write start timing setting circuit, provided with a first delay device before the delay devices in FIG. 2, including beam detectors and delay devices.

Further, in the embodiment as mentioned above, the image write start position S of each of the laser beams B1, B2, B3, and B4 is made available to be slightly adjusted. As another embodiment, each of the beam detection signals BS can also be configured to be set in a uniform delay time by providing a first delay device just after beam detector 7a to 7d, and 31 (in FIG. 21). This configuration is shown in FIGS. 20 and 21. The configuration in FIG. 20 corresponds to that in FIG. 2, and also the configuration in FIG. 21 corresponds to that in FIG. 11, with the above-noted modification.

Namely, in the embodiment shown in FIG. 20, a delay device 50 is mounted between amplifiers 10a through 10d, which amplify detection outputs from the laser beam detectors 7a through 7d, and the delay devices 11a through 11d. In addition, in the embodiment shown in FIG. 21, a first delay device 51 is provided between the amplifier 32 and the beam detection signal separator 33. The rest of the elements in FIGS. 20 and 21 are configured in a similar manner as shown in the aforementioned FIGS. 2 and 11, and a redundant explanation thereof is omitted.

In these embodiments of FIGS. 20 and 21, a large positional alignment, such as adjusting the so-called registration and setting the delay time or the like, is roughly performed with the first delay devices 50 and 51. A slight adjustment for the delay of the image write start position S due to the inclination of each of the laser beam detectors 7a through 7d, and 31, or the like, is performed with second delay devices 11a through 11d. A circuit for aligning the image write timing with a simple and enough accuracy can be realized by separate operations by both of the above first and second devices.

In addition, the adjustment for registration of the image write start position S can be performed by giving one set value to the first delay device after the setting values of each of the laser beam positions are set to the second delay device regardless of positional deviation of each of the laser beams.

Further, even in the same machine as the aforementioned embodiment, in an image forming apparatus in which an image output speed is configured to be variable by a manufacture setting, or in an image forming apparatus in which the change of the resolution can be performed by a user setting, the image write start position S is aligned by changing the delay time depending on the change of the rotation speed of the rotary polygon mirror 3, as mentioned above.

Furthermore, the same timing signals as the timing signals a through d, and a' through d' in FIG. 2 are labeled as identical reference numerals in these figures, and a detailed explanation is omitted.

The controller of this invention may be conveniently implemented using a conventional general purpose digital computer or microprocessor programmed according to the teachings of the present specification, as is apparent to those skilled in the computer technology. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This document is based on Japanese patent application JPAP10-000370 filed on Jan. 5, 1998, and JPAP10-001004 filed on Jan. 6, 1998, the entire contents of which are hereby incorporated by reference.

What is claimed is:

1. An image forming apparatus that forms an image by scanning a recording medium with a plurality of light beams that are modulated by individual image forming signals respectively corresponding to said light beams, said image forming apparatus comprising:

a beam detecting device configured to detect said plurality of light beams at preset positions and to output corresponding detection signals;

at least one delay device configured to delay each of said detection signals from said beam detecting device by a variable time period which is determined individually for each of said detection signals, said at least one delay device including a first delay element configured to delay all of said detection signals from said beam detecting device by a same time period to output first delayed signals and a second delay element configured to receive the first delayed signals and to delay each of said first delayed signals from said first delay element by a variable time period which is determined individually for each of said detection signals; and a reference clock signal generating device configured to generate a plurality of reference clock signals based on the delayed detection signals output from said at least one delay device, wherein said image forming apparatus performs an image forming operation according to said plurality of reference clock signals.

2. An image forming apparatus according to claim 1, wherein said at least one delay device delays a selected one of said light beams by a predetermined and fixed delay time, said selected one of said light beams being detected at a location closest to a predetermined image write start position.

3. An image forming apparatus according to claim 1, wherein a number of said at least one delay device is equal to a number of said light beams, each of said at least one delay devices delaying a respective of each of said light beams.

4. An image forming apparatus according to claim 2, wherein a number of said at least one delay device is equal to a number of said light beams, each of said at least one delay devices delaying a respective of each of said light beams.

5. An image forming apparatus according to claim 1, wherein one delay device is provided for delaying each of said plurality of light beams.

6. An image forming apparatus according to claim 2, wherein one delay device is provided for delaying each of said plurality of light beams.

7. An image forming apparatus that forms an image by scanning a recording medium with a plurality of light beams that are modulated by individual image forming signals respectively corresponding to said light beams, said image forming apparatus comprising:

a beam detecting device configured to detect said plurality of light beams at detection signals corresponding to each of said light beams detecting an incidence of said plurality of light beams at a preset position; and at least one delay device configured to delay each of said detection signals from said beam detecting device by a variable time period which is determined individually for each of said detection signals, and to control said image write start position of each of said light beams, said at least one delay device including a first delay element configured to delay all of said detection signals from said beam detecting device by a same time period to output first delayed signals and a second delay element configured to receive the first delayed signals and to delay each of said first delayed signals from said first delay element by a variable time period which is determined individually for each of said detection signals; and a reference clock signal generating device configured to generate a plurality of reference clock signals based on the delayed detection signals output from said at least one delay device, wherein said image forming apparatus performs an image forming operation according to said plurality of reference clock signals.

8. An image forming apparatus according to claim 7, wherein said at least one delay device delays a selected one of said light beams by a predetermined and fixed delay time, said selected one of said light beams being detected at a location closest to a predetermined image write start position.

9. An image forming apparatus according to claim 7, wherein said at least one delay device controls each image write start position of said light beams according to each of delayed detection signals output from said second delay element.

10. An image forming apparatus according to claim 9, wherein said second delay element delays a selected one of said light beams by a predetermined and fixed delay time, said selected one of said light beams being detected at a location closest to a predetermined image write start position.

11. An image forming apparatus according to claim 7, wherein scanning operations of said plurality of light beams are performed by a rotary polygon mirror and said variable time period of said delay device is automatically set in response to a change of a rotation speed of said rotary polygon mirror.

12. An image forming apparatus according to claim 9, wherein scanning operations of said plurality of light beams are performed by a rotary polygon mirror and said variable time period of said delay device is automatically set in response to a change of a rotation speed of said rotary polygon mirror.

13. An image forming apparatus that forms an image by scanning a recording medium with a plurality of light beams that are modulated by individual image forming signals respectively corresponding to said light beams, said image forming apparatus comprising:

beam detecting means for detecting said plurality of light beams at preset positions and for outputting corresponding detection signals;

at least one delay means for delaying each of said detection signals from said beam detecting means by a variable time period which is determined individually for each of said detection signals, said at least one delay means including a first delay means for delaying all of said detection signals from said beam detecting means by a same time period to output first delayed signals and a second delay means for receiving the first delayed signals and for delaying each of said first delayed signals from said first delay means by a variable time period which is determined individually for each of said detection signals; and reference clock signal generating means for generating a plurality of reference clock signals based on the delayed detection signals output from said at least one delay means, wherein said image forming apparatus performs an image forming operation according to said plurality of reference clock signals.

14. An image forming apparatus according to claim 13, wherein said at least one delay means delays a selected one of said light beams by a predetermined and fixed delay time, said selected one of said light beams being detected at a location closest to a predetermined image write start position.

15. An image forming apparatus according to claim 13, wherein a number of said at least one delay means is equal to a number of said light beams, each of said at least one delay means delaying a respective of each of said light beams.

16. The image forming apparatus according to claim 14, wherein a number of said at least one delay means is equal to a number of said light beams, each of said at least one delay means delaying a respective of each of said light beams.

17. The image forming apparatus according to claim 13, wherein one delay means is provided for delaying each of said plurality of light beams.

18. The image forming apparatus according to claim 14, wherein one delay means is provided for delaying each of said plurality of light beams.

19. An image forming apparatus that forms an image by scanning a recording medium with a plurality of light beams that are modulated by individual image forming signals respectively corresponding to said light beams, said image forming apparatus comprising:

beam detecting means for detecting said plurality of light beams at detection signals corresponding to each of said light beams detecting an incidence of said plurality of light beams at a preset position; and at least one delay means for delaying each of said detection signals from said beam detecting means by a variable time period which is determined individually for each of said detection signals, and for controlling said image write start position of each of said light beams, said at least one delay means including a first delay means for delaying all of said detection signals from said beam detecting means by an equal time period to output first delayed signals and a second delay means for receiving the first delayed signals and for delaying each of said first delayed signals from said first delay means by a variable time period which is determined individually for each of said detection signals; and a reference clock signal generating device configured to generate a plurality of reference clock signals based on the delayed detection signals output from said at least one delay device, wherein said image forming apparatus performs an image forming operation according to said plurality of reference clock signals.

20. The image forming apparatus according to claim 19, wherein said at least one delay means delays a selected one of said light beams by a predetermined and fixed delay time, said selected one of said light beams being detected at a location closest to a predetermined image write start position.

21. The image forming apparatus according to claim 19, wherein said at least one delay means controls each image write start position of said light beams according to each of delayed detection signals output from said second delay element means.

22. The image forming apparatus according to claim 21, wherein said second delay means delays a selected one of said light beams by a predetermined and fixed delay time, said selected one of said light beams being detected at a location closest to a predetermined image write start position.

23. The image forming apparatus according to claim 19, wherein scanning operations of said plurality of light beams are performed by a rotary polygon mirror means and said variable time period of said at least one delay means is automatically set in response to a change of a rotation speed of said rotary polygon mirror means.

24. The image forming apparatus according to claim 21, wherein scanning operations of said plurality of light beams are performed by a rotary polygon mirror means and said variable time period of said at least one delay means is automatically set in response to a change of a rotation speed of said rotary polygon mirror means.

25. An image forming method for controlling timing for a plurality of laser beams to write an image, comprising the steps of:

detecting a plurality of light beams at preset positions;

outputting detection signals corresponding to said plurality of detected light beams;

delaying each of said detection signals from a beam detecting device by a variable time period which is determined individually for each of detection signals, said delaying step including a first step of delaying all of said detection signals from said beam detecting device by a same time period and a second step of receiving the first delayed signals and delaying each of said first delayed signals by a variable time period which is determined individually for each of said detection signals;

generating a plurality of reference clock signals based on the delayed detection signals output from at least one delay device; and performing an image forming operation according to said plurality of reference clock signals.

* * * * *